US006172831B1

(12) United States Patent
Usui

(10) Patent No.: US 6,172,831 B1
(45) Date of Patent: Jan. 9, 2001

(54) METHOD OF RECORDING/REPRODUCING DIGITAL SIGNAL ON MAGNETIC RECORDING MEDIUM THROUGH HELICAL SCANNING BY USING READ-AFTER-WRITE FUNCTION AND APPARATUS FOR CARRYING OUT THE SAME

(75) Inventor: Takumi Usui, Utsunomiya (JP)

(73) Assignee: Aiwa Co., Ltd., Tokyo (JP)

( * ) Notice: Under 35 U.S.C. 154(b), the term of this patent shall be extended for 0 days.

(21) Appl. No.: 09/264,214

(22) Filed: Mar. 5, 1999

(30) Foreign Application Priority Data

Jul. 7, 1998  (JP) .................................................. 10-191632

(51) Int. Cl.⁷ .............................. G11B 15/14; G11B 5/00
(52) U.S. Cl. .................................................. 360/64; 360/8
(58) Field of Search .................................... 360/64, 8, 31, 360/53

(56) References Cited

U.S. PATENT DOCUMENTS

| 5,099,375 | 3/1992 | Ishii et al. . |
| 5,142,422 | 8/1992 | Zook et al. .............................. 360/54 |

FOREIGN PATENT DOCUMENTS

| 3828020 | 2/1990 | (DE) . |
| 4002971 | 8/1990 | (DE) . |

OTHER PUBLICATIONS

Patent Abstracts of Japan, vol. 12, No. 323 (P–752), Sep. 2, 1988 and JP 63–086105 (Matsushita Electric Ind).

Patent Abstracts of Japan, vol. 13, No. 112 (P–844), Mar. 7, 1989 and JP 63–288492 (Matsushita Electric Corp.

Patent Abstracts of Japan, vol. 17, No. 150 (E–1339), Mar. 25, 1993 and JP 04–317283 (Victor Co. of Japan Ltd.).

*Primary Examiner*—W. Chris Kim
(74) *Attorney, Agent, or Firm*—David B. Abel, Esq.; Squire, Sanders & Dempsey L.L.P.

(57) ABSTRACT

A digital signal recording method and apparatus for recording digital signals of two channels along tracks on a magnetic tape in a helical pattern by employing at least two pairs of rotary heads mounted on a rotatable drum oppositely to each other and by making use of a read-after-write function, the paired heads being disposed adjacent to each other. The input signal to be recorded is compressed such that the digital signal recording period for each relevant track is shortened by a ratio corresponding to a time for which a write period for one track and a read period for adjacent one overlap each other. The write period and the read period are thus prevented from overlapping. The reproduced signal for the read-after-write function is prevented from being masked by an input signal recording current.

10 Claims, 9 Drawing Sheets

FIG.1
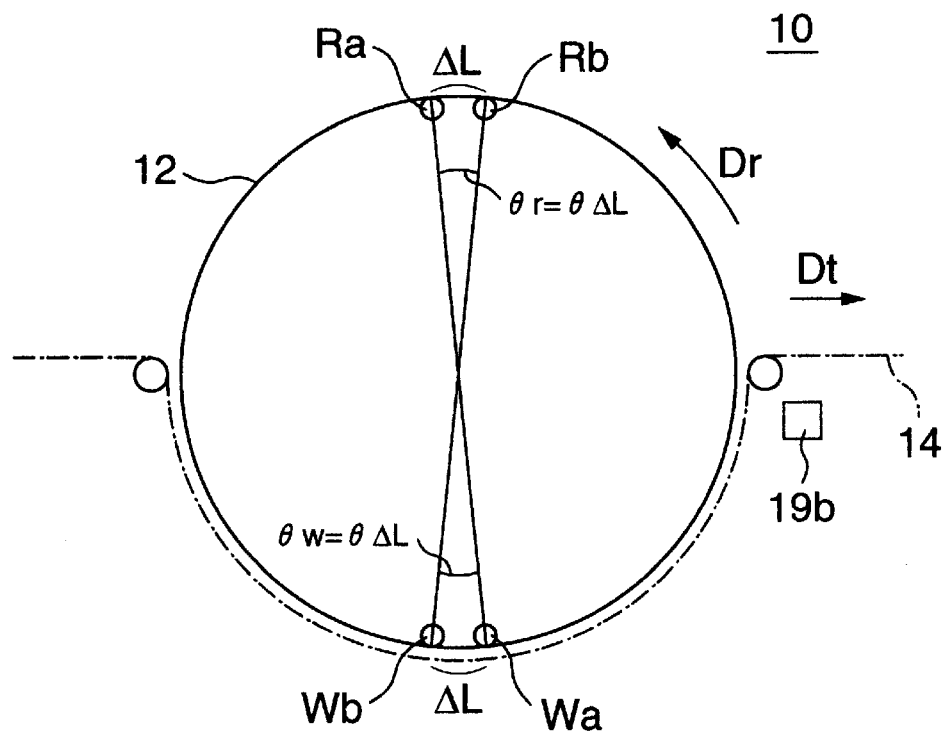
FIG.2A
FIG.2B
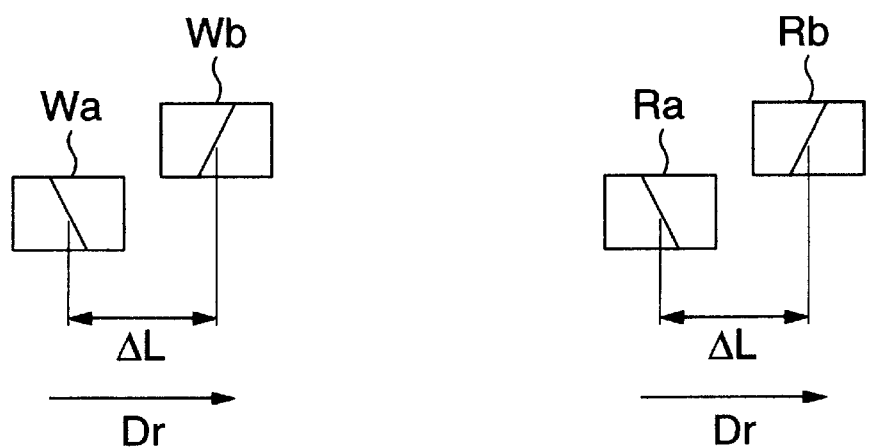

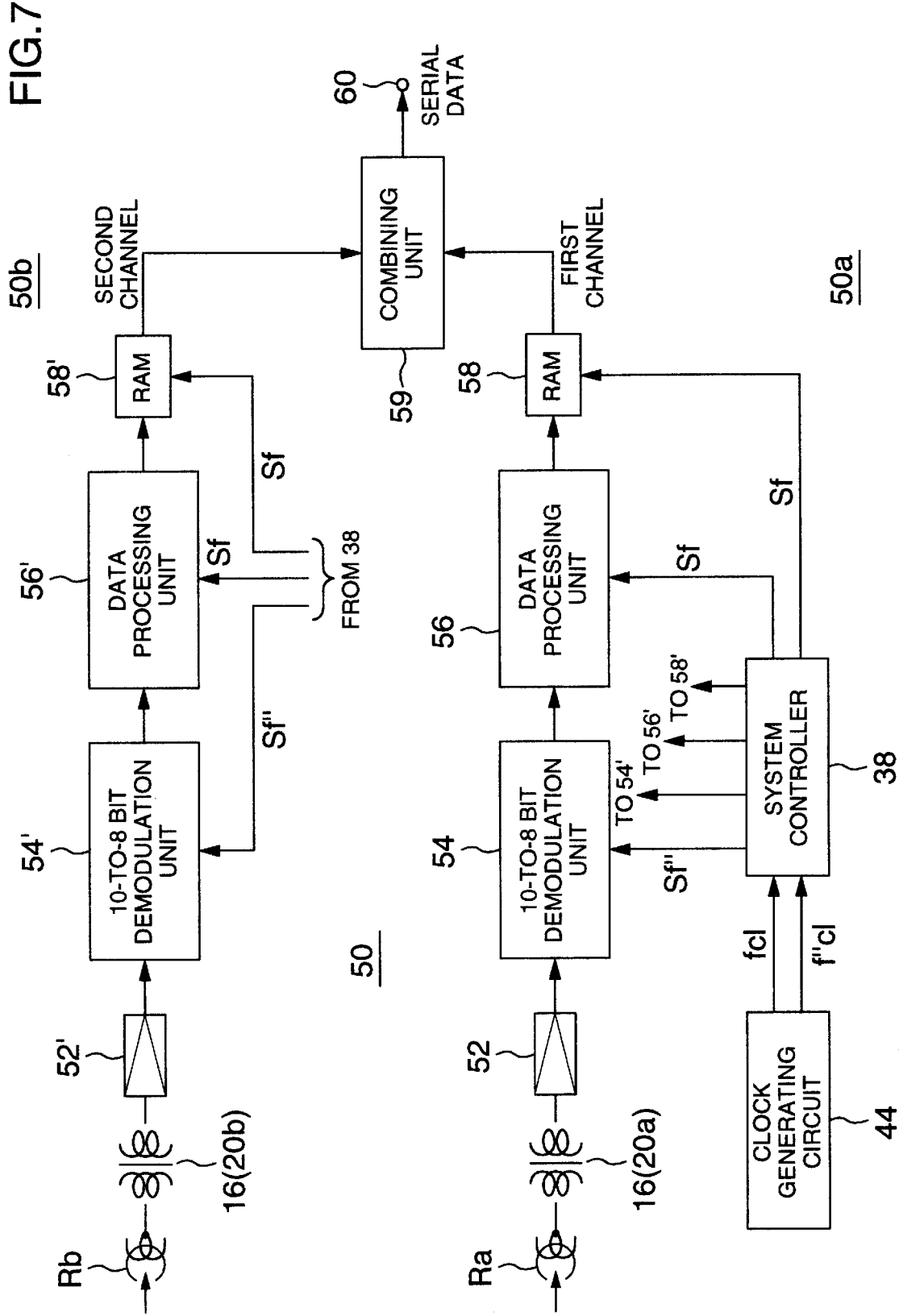

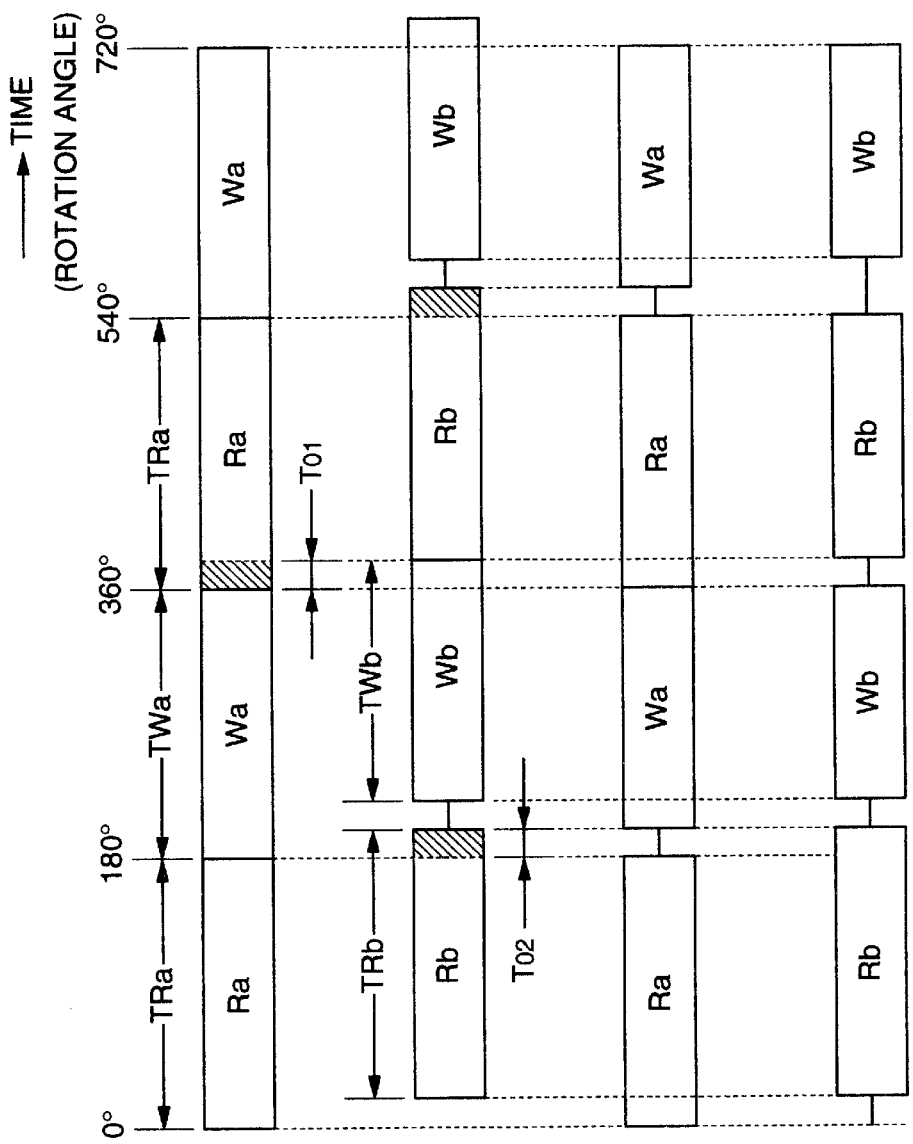
FIG.10A FIRST CHANNEL
FIG.10B SECOND CHANNEL
FIG.10C FIRST CHANNEL
FIG.10D SECOND CHANNEL

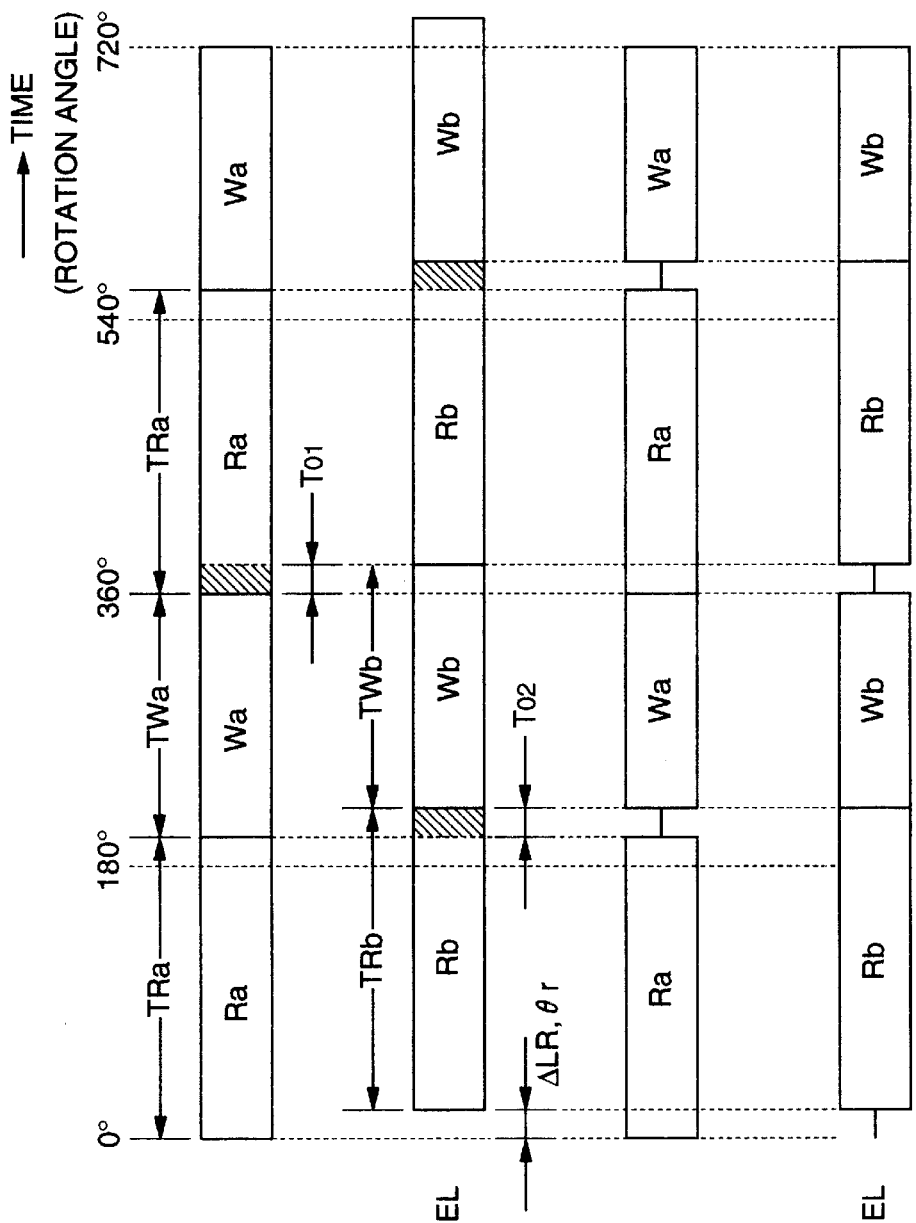

US 6,172,831 B1

METHOD OF RECORDING/REPRODUCING DIGITAL SIGNAL ON MAGNETIC RECORDING MEDIUM THROUGH HELICAL SCANNING BY USING READ-AFTER-WRITE FUNCTION AND APPARATUS FOR CARRYING OUT THE SAME

BACKGROUND OF THE INVENTION

The present invention relates to a helical-scan type digital signal recording/reproducing method for recording and/or reproducing digital data on and/or from a magnetic recording medium by using a rotatable magnetic head drum assembly and by making use of a read-after-write or RAW function for confirming the recorded state of the signal. The present invention is also concerned with a signal recording/reproducing apparatus for carrying out the method.

Of the digital signal recording apparatuses provided with a rotatable head drum assembly such as a digital video tape recorder (also referred to as the VTR in abbreviation), there exists a recording apparatus which is equipped with a read-after-write function (also referred to as the RAW function) for making it possible to confirm or verify the recorded state of a signal immediately after the recording thereof. The read-after-write function is known also as the verifying function. Incidentally, the recording apparatus imparted with the read-after-write or RAW function is disclosed, for example, in U.S. patent application Ser. No. 433,961 filed on Nov. 9, 1989 and now matured to U.S. Pat. No. 5,142,422.

In general, in the recording apparatus equipped with the RAW function such as mentioned above, an input signal is recorded with a pair of rotary heads, whereupon the input signal as recorded is instantaneously or immediately reproduced with another pair of rotary heads with a view to confirming or verifying the recorded state of the signal. In case the input signal is not recorded, appropriate measures such as repetitive recording of the same input signal may be taken.

Furthermore, there is also known such a recording apparatus in which an input signal of two or dual channels recorded with a pair of rotary heads are simultaneously reproduced on a channel-by-channel basis by means of another pair of rotary heads even when the recording apparatus is not provided with the read-after-write or RAW function.

For having better understanding of the present invention, background techniques thereof will first be described in some detail. FIG. 1 of the accompanying drawings shows, by way of example, a structure of a rotatable magnetic head drum assembly 10 employed in a recording apparatus imparted with the RAW function. Referring to the figure, a rotatable magnetic head drum assembly designated generally by reference numeral 10 includes a rotatable drum 12 provided with a pair of rotary heads (first and second rotary heads) Wa and Wb which are mounted on the outer periphery surface of the rotatable drum 12 with a predetermined angular space ΔL therebetween as viewed in the rotating direction Dr of the rotatable drum 12, wherein the rotary heads Wa and Wb are positioned adjacent to each other in a direction orthogonal to the rotating direction Dr, as can be clearly seen in FIG. 2A. Furthermore, another pair of rotary magnetic heads, i.e., a third rotary head Ra and a fourth rotary head Rb, are mounted on the rotatable drum 12 substantially in diametrical opposition to the pair of the rotary heads Wa and Wb (i.e., with an angular space of ca. 180° relative to the heads Wa and Wb), wherein the third and fourth rotary heads Ra and Rb are disposed with an angular space ΔL therebetween in the rotating direction Dr of the rotatable drum 12 and adjacent to each other in the direction normal to the rotating direction Dr, as can be clearly seen in FIG. 2B. When the first and second rotary heads Wa and Wb are operated as the recording or write heads, respectively, the third and fourth rotary heads Ra and Rb then serve as the reproducing or read heads for confirming or verifying the signal state recorded by the heads Wa and Wb. Of course, the third and fourth rotary heads Ra and Rb can operate also as the ordinary reproducing heads, respectively.

In the signal recording operation mode, a magnetic tape 14 is helically wound on and around the rotatable drum 12 over an angular span of ca. 180°, and record tracks Ta and Tb are generated sequentially in a helical pattern without intervening guard bands by means of the first rotary head Wa and the second rotary head Wb mentioned above, as is illustrated in FIG. 3. Parenthetically, in FIG. 3, reference symbol Dt designates a transporting or feeding direction of the magnetic tape 14 and Ds designates a scanning direction of the magnetic heads. In the rotatable magnetic head drum assembly 10, the mounting positions of the four rotary heads Wa; Wb and Ra; Rb on the rotatable drum 12 (or offsets between these heads) are so selected or determined that a pair of tracks i.e., the first track Ta and the second track Tb formed by the first and second rotary heads (recording heads) Wa and Wb can be scanned, respectively, by the third and fourth rotary heads (reproducing heads) Ra and Rb immediately in succession to the recording operation.

In the rotatable drum 12 constituting a main body of the rotatable magnetic head drum assembly 10, a rotary transformer is ordinarily provided as a means for transmitting the input signal to be recorded to the recording or write heads (first and second rotary heads) while transmitting the signal reproduced by the reproducing or read heads (third and fourth rotary heads) to an external signal processing circuitry.

FIG. 4 of the accompanying drawings shows schematically an exemplary arrangement of such rotary transformer. The rotatable drum 12 shown in FIG. 4 is composed of a stationary drum half 12a and a rotatable drum half 12b, wherein the rotary heads Wa; Wb and Ra; Rb are mounted on the rotatable drum half 12b in the manner described above. A rotary transformer denoted generally by reference numeral 16 is disposed along a plane across which the stationary drum half 12a and the rotatable drum half 12b are disposed in opposition to each other.

In the case of the rotatable magnetic head drum assembly 10 illustrated in FIG. 4, there are formed in each of the stationary drum half 12a and the rotatable drum half 12b four recesses in a coaxial circular pattern around a rotating shaft of the rotatable drum 12, wherein four coils 18a; 18b and 20a; 20b are fixedly fit in these recesses, respectively. With the structure of the rotary transformer 16 shown in FIG. 4, the coils 18a and 18b may be used as a rotary transformer coil assembly for transmitting a recording signal from the stationary drum half 12a toward the rotatable drum half 12b while the other coils 20a and 20b may be used as the rotary transformer coil assembly for transmitting a reproduced signal from the rotatable drum half 12b toward the stationary drum half 12a.

At this juncture, it should be recalled that when the first and second rotary heads Wa and Wb are mounted on the rotatable drum 12 with the angular space ΔL therebetween as viewed in the rotating direction of the drum 12, the third and fourth rotary heads Ra and Rb are equally mounted on the rotatable drum 12 with the same angular space ΔL therebetween, as described hereinbefore by reference to FIGS. 2A and 2B. With the rotatable magnetic head drum assembly 10 of such structure, the input signal of the first channel is recorded and reproduced by means of the first rotary head Wa ad the third rotary head Ra, respectively, while the input signal of the second channel is recorded and reproduced by the second rotary head Wb and the fourth rotary head Rb, respectively. Furthermore, the first and third rotary heads on one hand and the second and fourth rotary heads are angularly distanced by ca. 180°. Consequently, there applies valid between the write or recording periods and read or reproducing periods of the aforementioned four rotary heads such relations as illustrated in FIGS. 5A and 5B, being developed in the drum rotating direction.

In conjunction with the developed views illustrated in FIGS. 5A and 5B, it should be recalled that the rotary heads Wa and Ra are positioned, being angularly distanced from each other by 180°, with the rotary heads Wb and Rb being also angularly distanced by 180°, and that the rotary heads Wa and Wb are mounted with the angular space ΔL therebetween with the rotary heads Ra and Rb being mutually distanced for the same space ΔL. In the verification or confirmation mode, the recording operation and the reproducing or read operation (the data verifying operation, to say another way) are repeated alternately for one and the same channel.

SUMMARY OF THE INVENTION

Now, consideration will be paid to the recording/reproducing operations for the first channel and the second channel. As can be seen in FIGS. 5A and 5B, the recording operation and the reproducing or read operation partially overlap each other during a period TΔL of a duration which corresponds to the length of the aforementioned angular space ΔL intervening between the recording or write heads (Wa; Wb) and between the reproducing or read heads (Ra; Rb). See hatched regions shown in FIGS. 5A and 5B. More specifically, a leading section or portion of a write period (recording period) TWa1 during which writing or recording operation is performed by the write head Wa for the first channel and a trailing section or portion of a read period (reproducing period) TRb1 during which reading or reproducing operation is performed by the read head Rb (reproducing head) for the second channel partially overlap each other for a time period TΔLa=TΔL. Similarly, a trailing portion of a write period TWb1 during which writing or recording operation is performed by the write head Wb for the second channel and a leading portion of a read period TRa2 during which reading or reproducing operation is performed by the read head Ra for the first channel partially overlap each other for the time period TΔLb=TΔL. Incidentally, in FIGS. 5A and 5B, reference symbol TL designates the write periods (recording periods) of the write heads Wa and Wb, respectively, and the read periods (reproducing period) of the read heads Ra and Rb, respectively. During the write period as well as the read period, the relevant magnetic head rotates over an angular distance of 180 degrees.

Thus, in the leading portion of the write or recording period TWa1 (or in the trailing portion of the read or reproducing period TRb1), a time period TΔLa=TΔL which intervenes between the start of the signal recording by the rotary head Wa and the termination or end of the signal reproduction by the rotary head Rb represents the overlap period. During this overlap period TΔLa (=TΔL), a reproduced signal current flows through the coil 20b and at the same time a recording current for recording a signal flows through the coil 18a.

At this juncture, it should be mentioned that there exists an increasing tendency of manufacturing the video tape recorder in a smaller size in recent years. Consequently, the rotatable drum 12 employed in such digital tape recorder is realized in a correspondingly decreased size. For example, the rotatable drum 12 is so dimensioned that the diameter thereof lies within a range of 3 to 5 cm. As a result of this, the space intervening between the coils 18a and 18b as well as the space between the coils 20a and 20b is necessarily realized narrower. Under the circumstances, such situation is likely to occur that the signal recording current flowing through the coil 18a; 18b leaks to the coil 20a; 20b.

More specifically, the recording current is usually several ten times as large as the reproduced signal current. Consequently, the leakage of the recording current such as mentioned above will exert remarkably adverse influence to the reproduced signal current. As a result of this, the S/N (signal/noise) or C/N (carrier/noise) ratio of the reproduced signal Sb (second-channel reproduced signal) is degraded seriously during the individual overlap periods TΔLa, giving rise to a an unwanted possibility that no signal can be reproduced at all during the overlap period TΔLa.

Similarly, the rotary head Ra starts the signal reproducing or reading operation immediately in precedence to the end of recording operation performed by the rotary head Wb, as can be seen in FIGS. 5A and 5B. Consequently, during the overlap period TΔLb (=TΔL) which starts immediately after the start of the reproducing operation by the head Ra, the unwanted phenomenon described above may take place, incurring remarkable deterioration of the S/N ratio of the reproduced signal Sa (first-channel reproducing signal). As will now be appreciated, in the signal recording/reproducing apparatus equipped with the RAW function among others, remarkable degradation of the S/N ratio of the reproduced signal will occur periodically during short discrete periods.

In the light of the state of the art described above, it is an object of the present invention to provide a signal recording/reproducing method and an apparatus for carrying out the same which can successfully solve the problems of the conventional signal recording/reproducing apparatus described above.

Another object of the present invention is to provide a signal recording/reproducing method and an apparatus therefor in which an overlap period between a write or recording period and a read or reproducing period can be excluded from recording/reproducing operations for recording/reproducing a signal on/from a magnetic recording medium by using rotary magnetic heads while ensuring a function for confirming or verifying the recorded state of the signal such as the read-after-write or RAW function.

In view of the above and other objects which will become apparent as the description proceeds, there is provided according to an aspect of the present invention a helical-scan type digital data recording apparatus for recording digital data on a magnetic recording medium in a helical track pattern. The apparatus includes a compressing unit for compressing first and second input digital data to thereby output first and second compressed digital data, first and second recording rotary heads disposed on an outer peripheral surface of a rotatable drum, the first and second recording rotary heads being distanced from each other by a first predetermined space in a rotating direction of the rotatable drum and disposed adjacent to each other in a direction orthogonal to the rotating direction for writing the first and second compressed digital data supplied from the compressing unit onto two adjacent tracks, respectively, and first and second reproducing rotary heads disposed on the outer peripheral surface of the rotatable drum at positions opposite to the first and second recording rotary heads with reference to a center of the rotatable drum, the first and second reproducing rotary heads being distanced from each other by a second predetermined space in the rotating direction of the rotatable drum and disposed adjacent to each other in the direction orthogonal to the rotating direction for reading out the first and second compressed digital data recorded by the first and second recording rotary heads from the two adjacent tracks, respectively. The compressing unit is so designed as to compress the first digital data such that a recording period required for recording the first digital data on one track by the first recording rotary head is shortened by a time for which the recording period of the first recording rotary head for one track and a reproducing period of the second reproducing rotary head for one track overlap each other. Further, the compressing unit is adapted to compress the second digital data such that a recording period required for recording the second digital data on one track by the second recording rotary head is shortened by a time for which the recording period of the second recording rotary head for one track and a reproducing period of the first reproducing rotary head for one track overlap each other. Thus, the recording periods of the first and second recording rotary heads, respectively, and the reproducing periods of the first and second reproducing rotary heads, respectively, are prevented from overlapping each other.

Thus, in the digital signal recording method and apparatus according to the invention for recording the digital signals of two channels along the tracks on a magnetic recording medium such as a magnetic tape in a helical pattern, at least two pairs of rotary heads mounted on a rotatable drum oppositely to each other are employed for realizing the a read-after-write function. The heads in each pair are disposed adjacent to each other. The input signal to be recorded is compressed such that the digital signal recording period for each relevant track is shortened by a ratio corresponding to a time for which a write period for one track and a read period for adjacent one overlap each other. The write period and the read period can thus be prevented from overlapping. Thus, the reproduced signal for the read-after-write function is prevented from being masked by an input signal recording current. Owing to the features mentioned above, the reproduced signal can be prevented from degradation without fail.

More specifically, in a preferred mode carrying out the invention, the signal to be wholly recorded on a track of a length L can be recorded on a track section (L−ΔL), where ΔL represents a track region in which the read and write periods overlap each other. To this end, the frequency (clock signal) for recording the input signal may be increased by a value corresponding to the overlap region ΔL.

Thus, according to the teachings of the present invention, the input signal can be recorded by neglecting the overlap region ΔL. In that case, recording of the input signal can be started at the end of the recorded signal reading operation for ensuring the read-after-write function. In this way, signals of all channels as recorded can be read out with enhanced S/N ratio for the purpose of the read-after-write check.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a schematic view showing, by way of example, a rotatable magnetic head drum assembly in a signal recording/reproducing apparatus;

FIG. 2A is a schematic diagram for illustrating positional relation between a pair of write heads (recording heads) in the rotatable magnetic head drum assembly shown in FIG. 1;

FIG. 2B is a schematic diagram for illustrating positional relation between a pair of read heads (reproducing heads) in the rotatable magnetic head drum assembly shown in FIG. 1;

FIG. 7 is a block diagram showing a circuit configuration of a reproducing system (read system) in the digital signal recording apparatus equipped with the read-after-write function according to an embodiment of the present invention;

FIGS. 10A and 10B are timing charts for illustrating occurrence of overlap upon write/read operations of dual channel signals in a conventional signal recording apparatus known heretofore which is equipped with a read-after-write function and which includes a rotatable magnetic head drum assembly of the structure shown in FIG. 9;

FIGS. 10C and 10D are timing charts for illustrating dual-channel signal write/read operation of a digital signal recording apparatus according to yet another embodiment of the invention, which is designed for avoiding occurrence of overlap between a write (recording) period and a read (reproducing) period and in which the rotatable magnetic head drum assembly shown in FIG. 9 is employed;

FIGS. 12A and 12B are timing charts for illustrating occurrence of overlap upon write/read operation of dual-channel signals in the conventional signal recording apparatus which is equipped with the read-after-write function and which includes a rotatable magnetic head drum assembly of a structure shown in FIG. 11; and FIGS. 12C and 12D are timing charts for illustrating dual-channel signal write/read operation of a digital signal recording apparatus according to a still further embodiment of the invention, which is designed for avoiding occurrence of the overlap between a write (recording) period and a read (reproducing) period by employing the rotatable magnetic head drum assembly of the structure shown in FIG. 11.

DESCRIPTION OF THE PREFERRED EMBODIMENTS

Figure 3:
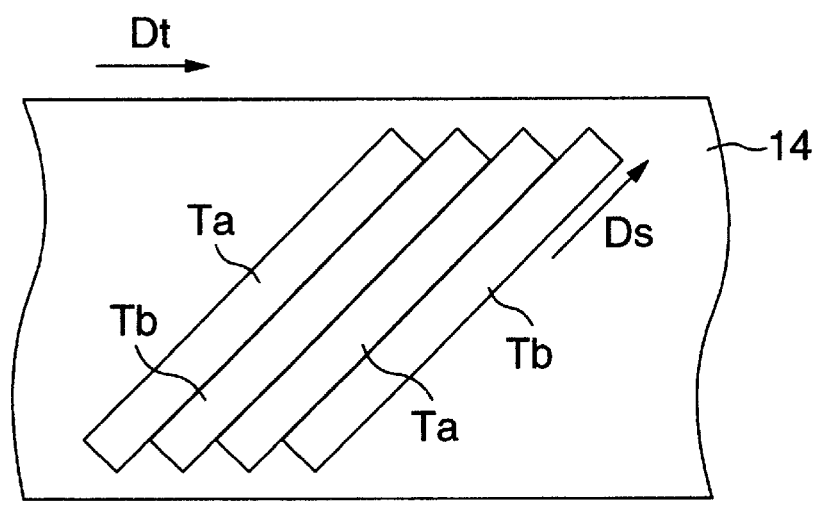
FIG. 3 is a view for illustrating tracks generated on a recording medium in a helical pattern by a recorder in which the rotatable magnetic head drum assembly shown in FIG. 1 is employed.
Figure 4:
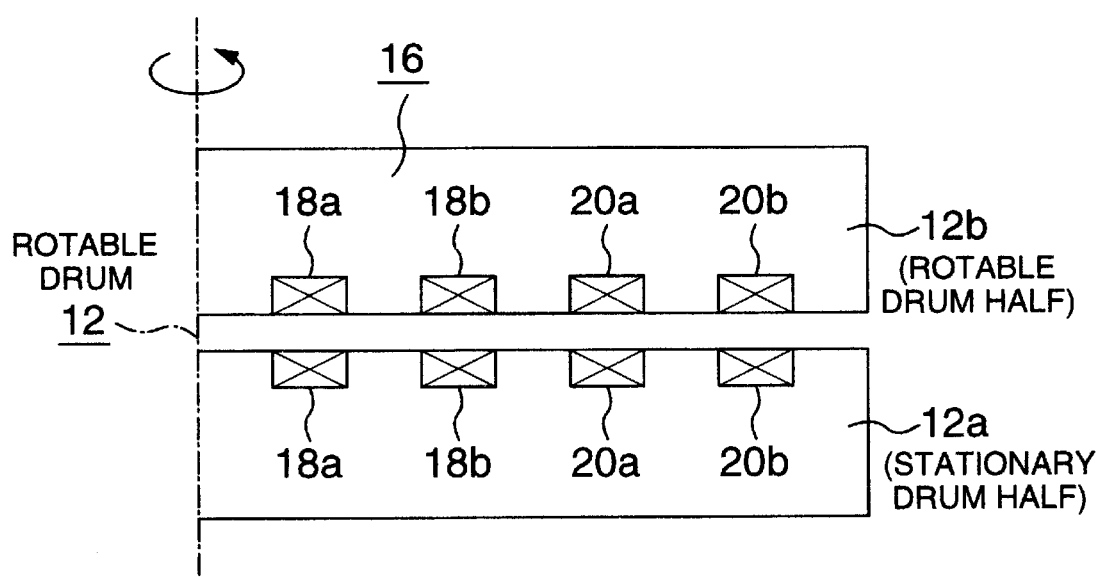
FIG. 4 is a schematic view for illustrating a structure of a rotary transformer incorporated in the rotatable magnetic head drum assembly for signal transmission.
Figure 5:
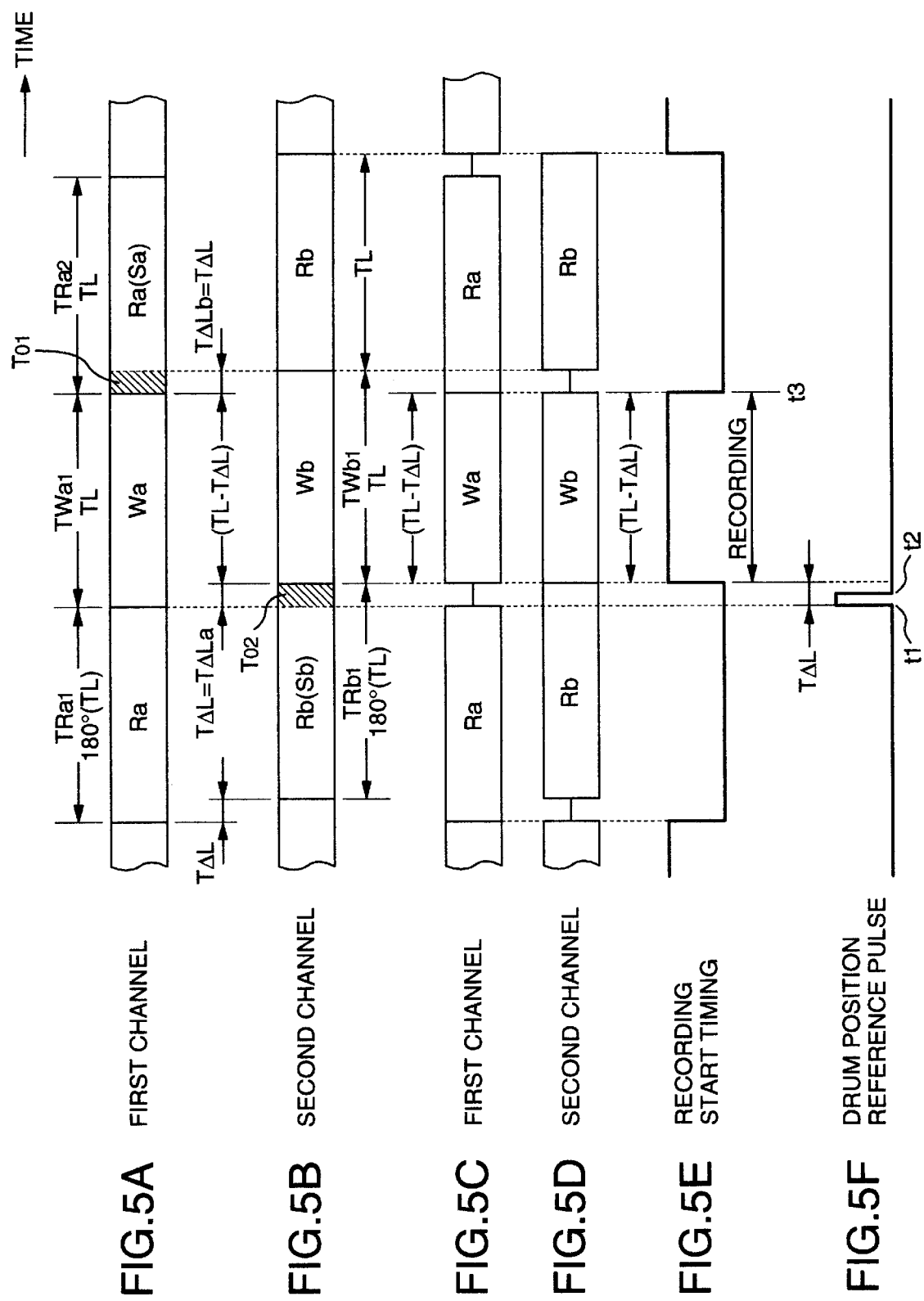
FIGS. 5A and 5B are timing charts for illustrating occurrence of overlap between a write period and a read period upon write/read operations of dual-channel signals in a conventional recording/reproducing apparatus known heretofore and equipped with a read-after-write function.
FIGS. 5C and 5D are timing charts for illustrating dual-channel signal write/read operations of a digital signal recording apparatus according to an embodiment of the present invention designed for avoiding occurrence of the overlap between a write (recording) period and a read (reproducing) period for validating the read-after-write function.
FIG. 5E is a timing chart showing a write (recording) start timing in the write (recording) operation mode shown in FIGS. 5C and 5D.
FIG. 5F is a timing chart illustrating a pulse signal indicating a write (recording) start timing in FIG. 5E.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "first", "second" and the like are words of convenience and are not to be construed as limiting terms. It should further be added that although the following description of exemplary embodiments of the present invention will be made on the assumption that the invention is applied to a digital data recorder of a digital signal recording apparatus such as a video tape recorder, it goes without saying that the present invention is never restricted to such recorder but can find application to various helical-scan type signal recording/reproducing apparatuses equipped with the read-after-write or RAW function for recording/reproducing signals on/from magnetic recording media. Furthermore, in the following description, components, functions and events which are same as or similar to those described hereinbefore by reference to FIGS. 1 to 5B are designated by like reference characters and repeated description thereof will be omitted.

Figure 6:
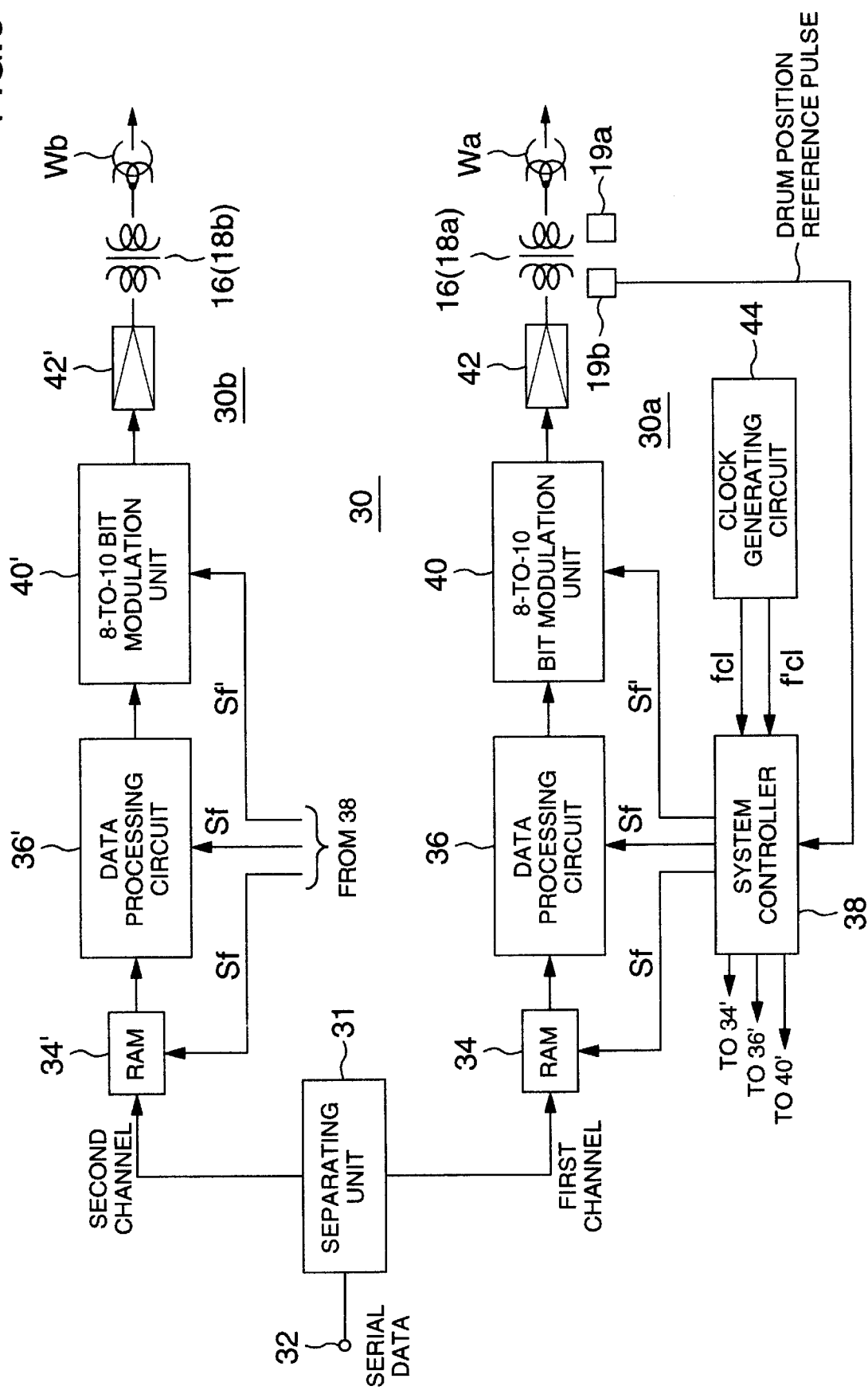
FIG. 6 is a block diagram showing a circuit configuration of a recording system (write system) in a digital signal recording apparatus equipped with the read-after-write function according to an embodiment of the present invention.

FIG. 6 is a block diagram showing a circuit arrangement of a data recording system (data write system) 30 in a digital signal recording/reproducing apparatus to which the present invention is applied, and FIG. 7 is a block diagram showing a circuit configuration of a data reproducing system (data read system) 50 in the digital recording/reproducing apparatus. It is assumed that a magnetic tape having a width of e.g. 8 mm is employed as the magnetic recording medium.

In the recording system 30 shown in FIG. 6, an input signal to be recorded, e.g. a digital signal of two channels (also referred to as the dual-channel digital signal), is supplied to an input terminal 32. When the digital signal recording/reproducing apparatus is to be operated as a data recorder, data resulting from processings executed by a computer or the like (not shown) is supplied to the terminal 32 as backup data.

The dual-channel digital data (serial data) supplied to the input terminal 32 is separated into the digital data of a first channel (hereinafter also referred to as the first-channel digital data) and that of a second channel (hereinafter also referred to as the second-channel digital data) by means of a separating circuit 31. The first-channel digital data outputted from the separating circuit 31 is fed to a recording circuitry chain 30a for the first channel (hereinafter also referred to as the first-channel recording circuitry), while the second-channel digital data is fed to a recording circuitry chain 30b for the second channel (hereinafter also referred to as the second-channel recording circuitry) from the output of the separating circuit 31.

In the following, description will be made of the first-channel recording circuitry 30a.

The first-channel digital data supplied to the first-channel recording circuitry 30a is supplied to a memory, e.g. a RAM (random access memory) 34 to be temporarily stored or saved therein.

The data read out from the RAM 34 undergoes data processings such as interleave processing, error correction/concealment processing, parity bit adding processing and the like in a data processing circuit 36. The processings for writing/reading the data in/from the RAM 34 as well as the data processings performed by the data processing circuit 36 are executed under the control of a system controller 38 incorporating a microcomputer in accordance with procedures per se known in the art.

The first-channel digital data (input signal) undergone the data processings mentioned above is then inputted to an 8-to-10 bit modulation unit 40 to be subjected to a bit-length conversion processing for converting, for example, 8-bit data into 10-bit data. This processing will also be referred to as the 8-to-10 bit modulation processing. Thereafter, the first-channel digital data outputted from the 8-to-10 bit modulation unit 40 is transmitted to a first write (recording) rotary head Wa by way of an amplifier 42 and a rotary transformer 16 to be recorded on the magnetic tape in a helical pattern.

Similarly to the first-channel recording circuitry 30a, the second-channel recording circuitry 30b is comprised of a RAM 34', a data processing circuit 36', an 8-to-10 bit modulation unit 40' and an amplifier 42', wherein data undergone the 8-to-10 bit modulation processing in the 8-to-10 bit modulation unit 40' is transmitted to a second write (recording) rotary head Wb via the amplifier 42' and the rotary transformer 16 (coil 18b) to be recorded on the magnetic tape in a helical pattern. The functions of the RAM 34', the data processing circuit 36', the 8-to-10 bit modulation unit 40' and the amplifier 42 are same as those of the RAM 34, the data processing circuit 36, the 8-to-10 bit modulation unit 40 and the amplifier 42, respectively. At this juncture, it should be mentioned that the system controller 38 and a clock generating circuit 44 are provided in common to both the first-channel recording circuitry 30a and the second-channel recording circuitry 30b.

FIG. 7 is a block diagram showing a circuit configuration of a reproducing system 50 in the digital signal recording/reproducing apparatus to which the present invention is applied. The reproducing system 50 includes a reproducing circuitry chain 50a for the first channel (hereinafter referred to also as the first-channel reproducing circuitry 50a) and a reproducing circuitry chain 50b for the second channel (hereinafter referred to also as the second-channel reproducing circuitry 50b).

Description will first be made as to the first-channel reproducing circuitry 50a. In the first-channel reproducing circuitry 50a, the reproduced 10-bit digital data read by the first read (reproducing) rotary head Ra is supplied to a preamplifier 52 by way of the rotary transformer 16 (coil 20a). Subsequently, the reproduced data is demodulated to the original bit length of the input signal by means of a 10-to-8 bit demodulation unit 54 which is constituted by a demodulating circuit designed for performing 10-to-8 bit demodulation processing (i.e., for converting the 10-bit digital data to the 8-bit digital data). The 8-bit data resulting from the demodulation is supplied to a data processing circuit 56 to undergo error detection processing as well as an error correction/concealment processing and a deinterleave processing, whereby the original data array or series is restored. For executing the deinterleave processing and others, a RAM (random access memory) 58 is provided for temporarily storing the data. The first channel data read out from the RAM 58 is combined with the second channel data outputted from a second-channel reproducing circuitry 50b described below by means of a synthesizing or combining unit 59, whereon the output of the combine unit 59 is supplied to the computer as the dual-channel serial digital data via an output terminal 60.

Similarly to the first-channel reproducing circuitry 50a, the second-channel reproducing circuitry 50b is comprised of a RAM 58', a data processing circuit 56', a 10-to-8 bit demodulation unit 54' and an amplifier 52'. The system controller 38 and the clock generating circuit 44 are provided in common to both the first-channel reproducing circuitry 50a and the second-channel reproducing circuitry 50b. The reproduced 10-bit digital data of the second channel as read by the second read (reproducing) rotary head Rb is sent to the preamplifier 52' via the rotary transformer 16 (coil 20b) to undergo the processings similar to those in the first-channel reproducing circuitry 50a to be finally supplied to the combining unit 59. Parenthetically, the functions of the RAM 58', the data processing circuit 56', the 10-to-8 bit demodulation unit 54' and the preamplifier 52' of the second-channel reproducing circuitry 50b are same as those of the RAM 58, the data processing circuit 56, the 10-to-8 bit demodulation unit 54 and the preamplifier 52, respectively.

The system controller 38 is provided in common to both the recording system 30 and the reproducing system 50 and the clock generating circuit 44 is connected to the system controller 38. The 8-to-10 bit modulation processing and the 10-to-8 bit demodulation processing described previously are performed in accordance with the recording frequency f on the basis of a clock signal (having a frequency fcl equivalent to the recording frequency f) which is generated by the clock generating circuit 44. By way of example, in the case where the input data has a transfer rate of 3 Mbps, the 8-to-10 bit modulation processing of the input data results in the modulated data having the transfer rate on the order of 10 Mbps. Accordingly, the clock frequency fcl and the recording frequency f may be set to be 10 MHz.

According to the present invention, it is taught that the data recording is performed by compressing the data so that all the data can be recorded within a period corresponding to the write period TL from which the overlap period TΔL is deleted (i.e., within the period given by TL−TΔL). More specifically, the data to be recorded is compressed by a ratio of (L−ΔL)/L, where L represents the track length with ΔL representing the space between the paired write heads and the paired read heads, respectively, as mentioned hereinbefore. By virtue of this arrangement, the actual recording frequency f' which is actually employed in the recorder of the digital signal recording/reproducing apparatus according to the present invention is higher than the above-mentioned recording frequency f by a value which is proportional to the inter-head angular space ΔL.

Now, an exemplary embodiment incarnating the above-mentioned teaching of the present invention will be described in concrete. As is shown in FIG. 1, the magnetic tape 14 is wound around the rotatable drum 12 over an angular distance of 180°, and a pair of write rotary heads Wa and Wb and a pair of read rotary heads Ra and Rb are mounted on the rotatable drum 12 in diametrical opposition to each other. In this conjunction, it is assumed, only by way of example, that the inter-head space ΔL which intervenes between the first and second write rotary heads Wa and Wb as well as between the first and second read rotary heads Ra and Rb, as viewed in the rotating direction of the rotatable drum 12, is 0.6 mm and that the diameter of the rotatable drum 12 is 4.7 cm. In that case, the inter-head space ΔL is substantially equivalent to an overlap angle ΘΔL of 1.46 degrees. This overlap angle ΘΔL can be determined as follows:

$$\theta\Delta L = \frac{0.6 \,(\text{mm}) \times 360}{47 \,(\text{mm}) \times \pi} = 1.46$$

Accordingly, it is required to determine the actual recording frequency f' by increasing the recording frequency f mentioned hereinbefore by a value corresponding to the overlap angle ΘΔL which is in proportion to the overlap period (TΔL). Namely, the actual recording frequency f' is determined as follows:

$$f' = f \times (180° + \theta\Delta L( = 1.46°))/180°$$
$$= 10.000 \text{ MHz} \times (180° + 1.46°)/180°$$
$$= 10.08 \text{ MHz}$$

Thus, the clock generating circuit 44 generates and supplies a clock signal of the frequency fcl=10.000 MHz and a clock signal of the frequency f'cl=10.08 MHz to the system controller 38. The system controller 38 generates a timing signal Sf' of the frequency f'=f'cl=10.08 MHz on the basis of the clock signal of the frequency f'cl=10.08 MHz and supplies the timing signal Sf' to the 8-to-10 bit modulation units 40, 40', whereby the modulation units 40, 40' perform the 8-to-10 bit modulation processing in accordance with the actual recording frequency f'.

Further, the system controller 38 generates a timing signal Sf of the frequency f=fcl=10.000 MHz on the basis of the clock signal of the frequency fcl=10.000 MHz and supplies the timing signal Sf to the RAMs 34, 34' and the circuits 36, 36' thereby to control them on the basis of the timing signal Sf.

In this manner, in the recorder of the digital signal recording/reproducing apparatus according to the instant embodiment of the invention, the 8-to-10 bit modulation processing described hereinbefore is performed under the timing given by the actual recording frequency f' which is determined by taking into consideration the overlap period (TΔL), as mentioned above. Thus, it is possible to compress the data to be recorded by a time corresponding to the overlap distance ΔL through the 8-to-10 bit modulation. Thus, the data recording can be performed by synchronizing the recording start timing $t_2$ for the first write rotary head Wa (illustrated in FIG. 5C) with that of the second write rotary head Wb (illustrated in FIG. 5E). To say in another way, recording by the first write rotary head Wa may be performed simultaneously with the recording by the second write rotary head Wb. In this way, all the data recorded during the period corresponding to the track length L in the conventional recorder described hereinbefore can be recorded in the compressed state within a period given by TL−TΔL which corresponds to the track length from which the overlap distance ΔL is subtracted, i.e., the track length given by L−ΔL. See FIGS. 5C and 5D.

In the reproducing system shown in FIG. 7, the 10-to-8 bit modulation units 54, 54' for performing the 10-to-8 bit modulation processing expand the first and second digital data having been reproduced thereby to reconstitute the data inputted from the computer to the terminal 32. To this end, the frequency f" of a timing signal Sf" supplied to the 10-to-8 bit modulation units 54, 54' is set as follows:

$$f'' = f \times 180/(180 + 1.46)$$
$$= 10.000 \text{ MHz} \times 180/(180 + 1.46)$$
$$= 9.919541 \text{ MHz}$$

Thus, the clock generating circuit 44 generates and supplies the clock signal of the frequency fcl=10.000 MHz and a clock signal of the frequency f"cl=9.919541 MHz to the system controller 38. The system controller 38 generates a timing signal Sf" of the frequency f"=f"cl=9.919541 MHz on the basis of the clock signal of the frequency f"cl=9.919541 MHz and supplies the timing signal Sf" to the 10-to-8 bit modulation units 54, 54', whereby the modulation units 54, 54' perform the 10-to-8 bit modulation processing in accordance with the actual reproducing frequency f".

Further, the system controller 38 generates the timing signal Sf of the frequency f=fcl=10.000 MHz on the basis of the clock signal of the frequency fcl=10.000 MHz and supplies the timing signal Sf to the RAMs 58, 58' and the circuits 56, 56' thereby to control them on the basis of the timing signal Sf.

The recording start timing mentioned above can be determined or validated as follows. A permanent magnet 19a is disposed in the vicinity of the first write rotary head Wa mounted on the rotatable drum half. Further, a magnetic sensor (e.g. Hall-effect sensor) 19b is disposed at a predetermined position of the stationary drum half (see FIG. 1) so that the magnetic sensor 19b faces oppositely to the permanent magnet 19a. By virtue of such arrangement, a drum position reference pulse is outputted from the magnetic sensor 19b at a time point $t_1$ shown in FIG. 5F (i.e., at the end of the read period of the first read rotary head Ra for the first channel) to be supplied to the system controller 38. Accordingly, a time point $t_2$ corresponding to the lapse of the aforementioned period TΔL from the rising time point $t_1$ of the drum position reference pulse represents the recording start timing. Thus, the system controller 38 is so designed as to command the read-out of the data for recording from the RAM 34 at the time point $t_2$ after the lapse of the period TΔL from the leading edge of the drum position reference pulse.

On the assumption that the angle corresponding to the inter-head space ΔL is 1.46 degrees as mentioned hereinbefore and that the rotational speed of the rotatable drum 12 is represented by N, the period TΔL can be determined as follows:

$$TΔL = N \times 1.46/360$$

As will now be appreciated from the above, since the recording start timing of the first write rotary head Wa is delayed for the time TΔL when compared with that of the conventional recorder (see FIG. 5A), the overlap between the write period TWa1 for the first channel and the read period TRb1 for the second channel (see FIG. 5B, To2 equivalent to Θr=ΘΔL in FIG. 1) makes disappearance. In this conjunction, it should however be noted that although the time point at which the writing operation of the first write rotary head Wa is started is delayed for the time TΔL as mentioned just above, the write operation of the first write rotary head Wa ends at a same time point $t_3$ as in the case of the conventional recorder because the write or recording period of the first write rotary head Wa is shortened by TΔL when compared with that of the conventional recorder. Furthermore, because the write start timing of the second write rotary head Wb for the second channel coincides with the write start timing of the first write rotary head Wa for the first channel, the end timing of the recording performed by the second write rotary head Wb coincides with the time point $t_3$. Thus, the overlap between the read period TRa2 for the first channel and the write period TWb1 for the second channel (FIG. 5A, To1 equivalent to Θw=ΘΔL in FIG. 1) makes disappearance.

Additionally, it is noted that at the time point when reproduction (read operation) for one channel has been completed, the recording (write operation) for the other channel is started. By virtue of this feature, the S/N ratio of the reproduced signal due to the leakage of the recording current to the coil 20a; 20b for the reproduced signal transmission can be prevented from degradation.

Figure 8A:
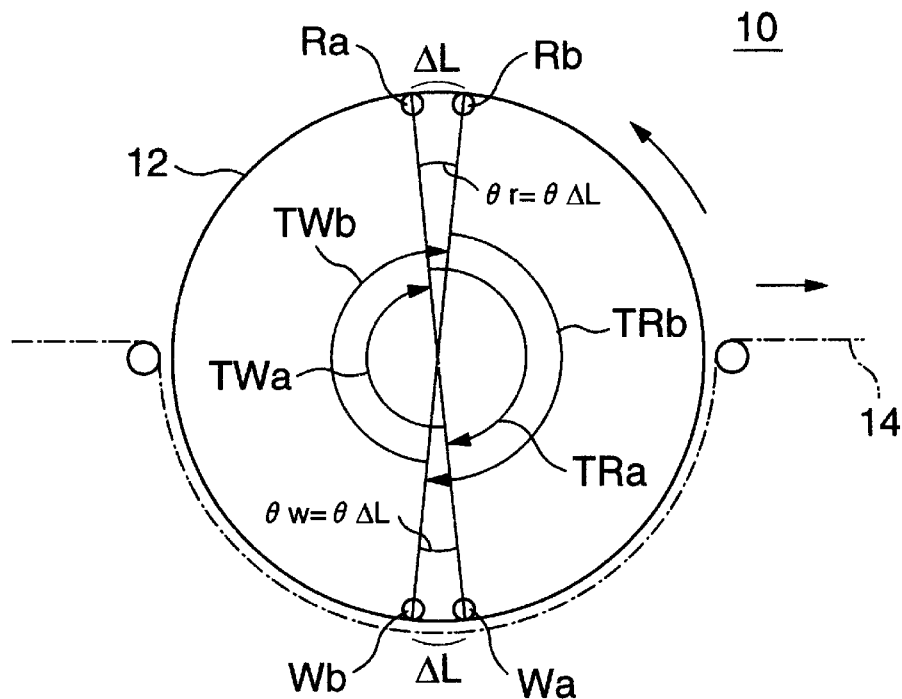
FIG. 8A is a schematic diagram for illustrating relations among positions of write/read rotary heads, read periods of first/second channels and write periods of the first/second channels in a conventional recording apparatus known heretofore.

FIG. 8A is a schematic diagram for illustrating relations among the positions of the individual heads Wa; Wb, Ra; Rb, a read period TRa for one track of the first channel, and a read period TRb for one track of the second channel as well as a write period TWa for one track of the first channel and a write period TWb for one track of the second channel in the conventional apparatus.

Figure 8B:
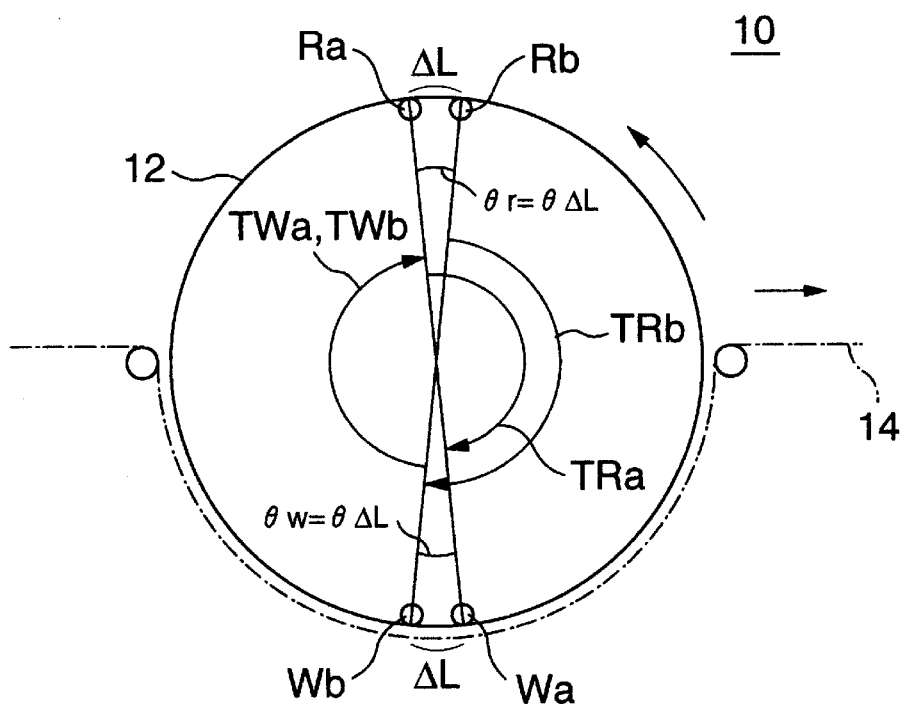
FIG. 8B is a schematic diagram for illustrating relations among positions of write/read rotary heads, read periods for first and second channels and write periods for the first and second channels in a digital signal recording apparatus according to an embodiment of the present invention.

On the other hand, FIG. 8B is a schematic diagram for illustrating relations among the positions of the individual heads Wa; Wb, Ra; Rb, a read period TRa for one track of the first channel, and a read period TRb for one track of the second channel as well as a write period TWa for one track of the first channel and a write period TWb for one track of the second channel in the recorder according to the instant embodiment of the present invention.

As can be seen from FIG. 8B, in the case of the recorder according to the instant embodiment of the invention, both the read period TRa for the first channel and the read period TRb for the second channel are same as the corresponding periods in the conventional digital signal recording apparatus described hereinbefore. It should however be noted that the write period TWa for the first channel and the write period TWb for the second channel are so set as not to overlap the read period TRa for the first channel and the read period TRb for the second channel, respectively, in the recorder according to the instant embodiment of the invention, as is shown in FIG. 8B. In this conjunction, it should be mentioned that the reason why the read period for one track is set longer than the write period for one track can be explained by the fact that all of the written or recorded data can not completely be read out or reproduced when the read period for one track is set shorter than the write period for one track.

It should further be added that even in the case where the data transfer rate of the input data differs from the data transfer rate mentioned previously, arrangement may be made such that the transfer rate of the data read out from the RAM 34 can always coincide with a predetermined rate (e.g. 3 Mbps as mentioned hereinbefore) by using the RAM 34 as the buffer memory, whereby the actual recording frequency f' can always assume a constant value regardless of the bit rate of the input signal.

As will be appreciated from the foregoing description, the present invention teaches that when the recording period and the reproducing period overlap partially with each other, the signal to be recorded is compressed by the ratio corresponding to the overlap period.

By virtue of the arrangement described above, the overlap period can be excluded from the signal recording period, whereby the influence exerted by the recording current to the reproduced signal during the overlap period described hereinbefore in conjunction with the conventional recorder can be avoided, which in turn means that the quality of the reproduced or read signal can positively be protected against deterioration in a satisfactory manner.

It will now be appreciated that the present invention can be profitably and advantageously applied to the data recording apparatus which is imparted with the recorded data confirming or verifying function (RAW function) and which is designed for recording simultaneously two or more channels of signals with the recording mode (write mode) and the reproducing mode (read mode) being repeated alternately.

In the digital signal recording apparatus according to the illustrated embodiment of the invention described above, the first and second read rotary heads Ra and Rb are disposed on the rotatable drum substantially at an angle of 180° relative to the first and second write rotary heads Wa and Wb with reference to the rotational center of the rotatable drum, wherein the first and second write rotary heads Wa and Wb are spaced from each other by the space ΔL (angle Θw) as viewed in the rotating direction of the rotatable drum while the first and second read rotary heads Ra and Rb are set apart from each other by the space ΔL (angle Θr=Θw) as viewed in the rotating direction of the rotatable drum 12.

Next, description will be directed to another example of the disposition of the first and second write rotary heads Wa; Wb and the first and second read rotary heads Ra; Rb in the recorder according to another embodiment of the present invention.

Figure 9:
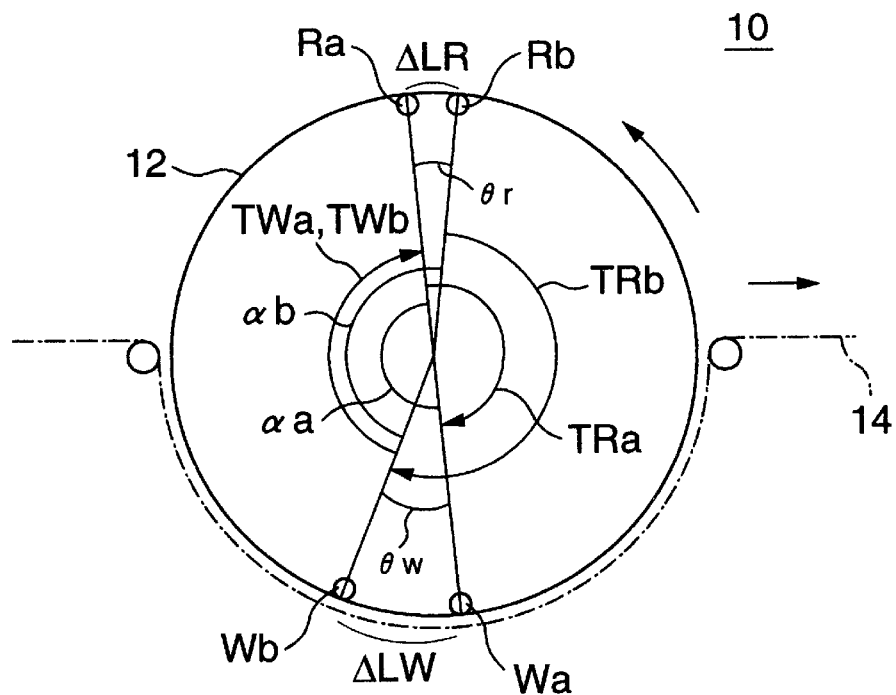
FIG. 9 is a schematic diagram for illustrating relations among positions of write/read rotary heads, read periods for first and second channels and write periods for the first and second channels in a digital signal recording apparatus according to another embodiment of the present invention.

FIG. 9 is a schematic view for illustrating relations among the positions of the first and second write rotary heads Wa; Wb and the first and second read rotary heads Ra; Rb, the read periods TRa; TRb for the first and second channels, respectively, and the write periods TWa; TWb for the first and second channels, respectively, according to another embodiment of the present invention. In the case of the head array shown in FIG. 9, the first read rotary head Ra is mounted at the position substantially in diametrical opposition to the first write rotary head Wa with reference to the rotational center of the rotatable drum 12 (i.e., at an intervening angle of approximately 180 degrees). However, the inter-head space ΔLW (angle Θw) between the positions at which the first and second write rotary heads Wa and Wb are mounted, respectively, is set greater than the inter-head space ΔLR (angle Θr) between the first and second read rotary heads Ra and Rb.

FIGS. 10A to 10D are timing charts for illustrating write/read operations of the helical scan type recording apparatus which is imparted with the RAW function and in which the rotatable drum assembly of the head array illustrated in FIG. 9 is employed. In these figures, time is taken along the abscissa together with the rotation angle of the rotatable drum 12. More specifically, FIGS. 10A and 10B are timing charts for illustrating the overlap taking place upon recording/reading of the dual-channel signal in the conventional apparatus which is imparted with the RAW or read-after-write function. As can be seen in FIGS. 10A and 10B, there occurs an overlap To1 equivalent to the angle Θr between the first-channel read period TRa and the second-channel write period TWb. Similarly, an overlap To2 equivalent to the angle Θw takes place between the first-channel write period TWa and the second-channel read period TRb.

By contrast, in the digital signal recording apparatus according to the instant embodiment of the present invention, although both the read period TRa for the first channel and the read period TRb for the second channel are same as the corresponding periods in the conventional recording apparatus, the recording or write period TWa for the first channel as well as the write period TWb for the second channel are so set as not to overlap the read period TRa for the first channel and the read period TRb for the second channel, respectively.

FIGS. 10C and 10D are timing charts for illustrating the write/read operation of the signal recording apparatus according to another embodiment of the present invention, which apparatus is so designed as to evade the occurrence of overlap upon recording and reproducing operations (write and read operations) of two channel signals with the rotatable drum head structure shown in FIG. 9. As can be seen in FIGS. 10C and 10D, occurrence of the overlap (To1; To2) is evaded by making the write start timing of the first write rotary head Wa coincide with the read end timing of the second read rotary head Rb while making the write end timing of the second write rotary head Wb coincide with the read start timing of the first read rotary head Ra.

Further, in the write or recording period TWa during which the first-channel digital data is written or recorded on one track by the first write rotary head Wa, the first-channel digital data is so compressed that the write period TWa is shortened by the overlap period (To2), while in the write or recording period TWb during which the second channel digital data is recorded on one track by the second write rotary head Wb, the second channel digital data is compressed so that the recording period TWb can be shortened by the overlap period (To1).

Figure 11:
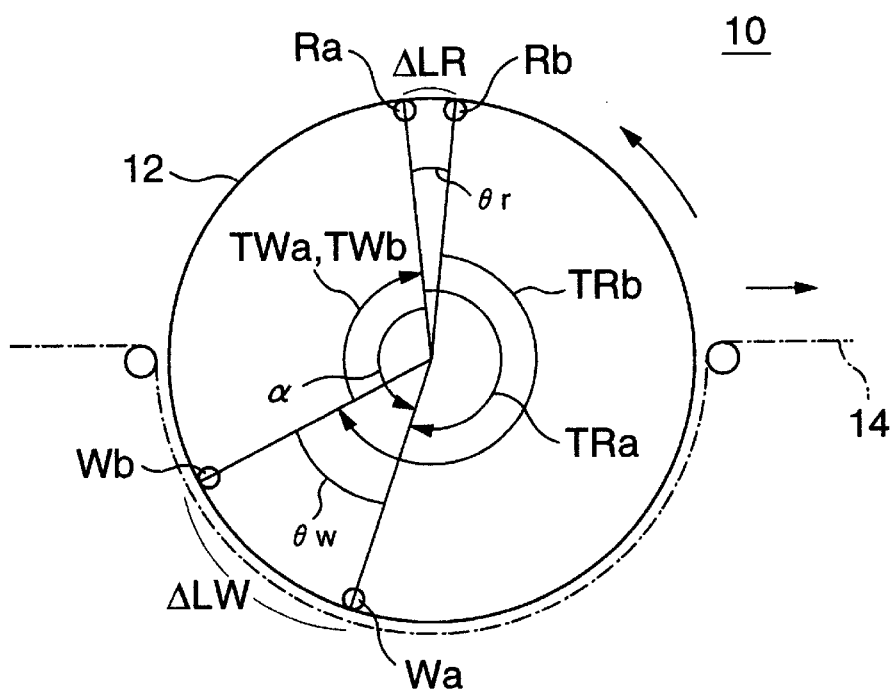
FIG. 11 is a schematic diagram for illustrating relations among positions of write/read rotary heads, read periods for first and second channels and write periods for the first and second channels in a digital signal recording apparatus according to a further embodiment of the present invention.

FIG. 11 is a schematic view for illustrating relations among the positions of the first and second write rotary heads Wa; Wb and the first and second read rotary heads Ra; Rb, the read periods TRa; TRb for the first and second channels, respectively, and the write periods TRa; TWb for the first and second channels, respectively, according to yet another embodiment of the present invention. In the case of the head array shown in FIG. 11, the first and second read rotary heads Ra; Rb are not mounted at the positions diametrically opposite to the first and second write rotary heads Wa: Wb, respectively, with reference to the rotational center of the rotatable drum 12 (i.e., at an intervening angle of approximately 180 degrees). Further, the inter-head space ΔLW (angle Θw) between the positions at which the first and second write rotary heads Wa and Wb are mounted, respectively, is set greater than the inter-head space ΔLR (angle Θr) between the first and second read rotary heads Ra and Rb, respectively.

Parenthetically, in the rotatable drum head structure shown in FIGS. 9 and 11, the overlap takes place when the conditions mentioned below are satisfied. Namely, $$\alpha \leq 180 - \Theta w \quad (1)$$

$$\Theta r \leq \Theta w \quad (2)$$

where α represents an angle between the first read rotary head Ra and the first write rotary head Wa in the rotating direction of the rotatable drum, as can be seen in FIG. 11. At this juncture, it should be mentioned that the teachings of the present invention can be applied to the signal recording apparatus provided with the rotatable head drum assembly which satisfies the above-mentioned conditions.

FIGS. 12A to 12D are timing charts for illustrating write/read operations of the helical scan type recording apparatus which is imparted with the RAW function in which the rotatable drum assembly of the head array illustrated in FIG. 11 is employed. In these figures, time is taken along the abscissa together with the rotation angle of the rotatable drum 12. More specifically, FIGS. 12A and 12B are timing charts for illustrating the overlap taking place upon write/read operations of the two-channel signal in the conventional recording apparatus which is imparted with the read-after-write function. As can be seen in FIGS. 12A and 12B, there occurs an overlap (To1 equivalent to the angle Θr) between the first-channel read period TRa and the second-channel write period TWb. Similarly, an overlap To2 equivalent to the angle Θw makes appearance between the first-channel write period TWa and the second-channel read period TRb.

Thus, also in the signal recording apparatus according to the instant embodiment of the invention, although the read period TRa for the first channel and the read period TRb for the second channel are set similarly to the corresponding periods in the conventional recording apparatus described hereinbefore, the write period TWa for the first channel as well as the write period TWb for the second channel are so set as not to overlap the read period TRa for the first channel and the read period TRb for the second channel, respectively, as can be seen in FIG. 11.

FIGS. 12C and 12D are timing charts for illustrating the write/read operation of the signal recording apparatus according to yet another embodiment of the invention, which apparatus is so designed as to evade the occurrence of overlap upon recording write/read operations of two channel signals with the rotatable drum head structure shown in FIG. 11. As can be seen in FIGS. 12C and 12D, occurrence of the overlap (To1; To2) is evaded by making the write start timing of the first write rotary head Wa coincide with the read end timing of the second read rotary head Rb while making the write end timing of the second write rotary head Wb coincide with the read start timing of the first read rotary head Ra.

Further, in the write period TWa during which the first-channel digital data is recorded on one track by the first write rotary head Wa, the first-channel digital data is so compressed that the above-mentioned write period TWa is shortened by the overlap period (To2), while in the write period TWb during which the second channel digital data is recorded on one track by the second write rotary head Wb, the second channel digital data is so compressed that the recording period TWb can be shortened by the overlap period (To1).

The recording system as well as the reproducing system of the digital data recorder for realizing the data compression with a view to excluding the overlap as described by reference to FIGS. 9 to 12D may be implemented in the similar structure as those described hereinbefore by reference to FIGS. 6 and 7, substantially to same effect.

Finally, it should be mentioned that in each of the digital signal recorders described above, the 8-to-10 bit modulation unit (compressing means) 40; 40' is so designed as to compress the first digital data by a ratio Θw/αa while compressing the second digital data by a ratio Θr/αb, where Θw represents the angle intervening between the first write rotary head (Wa) and the second write rotary head (Wb) on the outer periphery of the rotatable drum (12) as viewed in the rotating direction thereof, and satisfies the condition that Θw<180°, αa represents the angle intervening between the first read rotary head (Ra) and the first write rotary head (Wa) on the outer periphery of the rotatable drum (12) as viewed in the rotating direction thereof, and satisfies the condition that αa<180° (see FIG. 9), Θr represents the angle intervening between the first read rotary head (Ra) and the second read rotary head (Rb) on the outer periphery of the rotatable drum (12) as viewed in the rotating direction thereof, and satisfies the condition that Θr<180°, and αb represents the angle intervening between the second read rotary head (Rb) and the second write rotary head (Wb) on the outer periphery of the rotatable drum (12) as viewed in the rotating direction thereof, and satisfies the condition that αb<180° (see FIG. 9).

In other words, the 8-to-10 bit modulation unit (which serves also as the compressing means) 40; 40' is so arranged as to compress the first digital data by increasing the frequency for recording the first digital data by αa/Θw while compressing the second digital data by increasing the frequency for recording the second digital data by αb/Θr.

Thus, in the reproducing system, the 10-to-8 bit demodulation unit (which serves also as the expanding means) 54; 54' is so arranged as to expand the first digital data as read out by αa/Θw while expanding the second read-out digital data by αb/Θr. In other words, the 10-to-8 bit demodulation unit 54; 54' is so arranged as to expand the first digital data by decreasing the frequency for reproducing the first digital data by Θw/αa while expanding the second digital data by decreasing the frequency for reproducing the second digital data by Θr/αb to thereby reconstitute the data inputted from the computer to the terminal 32.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described.

By way of example, although it has been described that the data compression is realized with the aid of the 8-to-10 bit modulation unit (40) and the 10-to-8 bit demodulation unit (54) by controlling the operation timings thereof with the so-called actual recording frequency f' which is determined by taking into consideration the overlap period, it will readily occur to those having ordinary knowledge in this art that such data compression can also be realized by making use of a data compressor which per se is known in the art. Furthermore, a variable recording frequency generating circuit may be employed for generating the actual recording frequency f'.

Accordingly, all suitable modifications and equivalents may be resorted to, falling within the spirit and scope of the invention.

What is claimed is:

1. A helical-scan type digital data recording apparatus for recording digital data on a magnetic recording medium in a helical track pattern, comprising:

compressing means for compressing first and second input digital data to thereby output first and second compressed digital data;

first and second recording rotary heads disposed on an outer periphery of a rotatable drum, said first and second recording rotary heads being distanced from each other by a first predetermined space in a rotating direction of said rotatable drum and disposed adjacent to each other in a direction orthogonal to said rotating direction for writing said first and second compressed digital data supplied from said compressing means onto two adjacent tracks, respectively; and first and second reproducing rotary heads disposed on the outer periphery of said rotatable drum at positions opposite to said first and second recording rotary heads with reference to a center of said rotatable drum, said first and second reproducing rotary heads being distanced from each other by a second predetermined space in the rotating direction of said rotatable drum and disposed adjacent to each other in the direction orthogonal to said rotating direction for reading out the first and second compressed digital data recorded by said first and second recording rotary heads from said two adjacent tracks, respectively, wherein said compressing means compresses said first digital data such that a recording period required for recording said first digital data on one track by said first recording rotary head is shortened by a time for which the recording period of said first recording rotary head for one track and a reproducing period of said second reproducing rotary head for one track overlap each other; and wherein said compressing means compresses said second digital data such that a recording period required for recording said second digital data on one track by said second recording rotary head is shortened by a time for which the recording period of said second recording rotary head for one track and a reproducing period of said first reproducing rotary head for one track overlap each other, whereby the recording periods of said first and second recording rotary heads, respectively, and the reproducing periods of said first and second reproducing rotary heads, respectively, are prevented from overlapping each other.

2. A helical-scan type digital data recording apparatus according to claim 1, wherein said compressing means compresses said first digital data by a ratio $\Theta w/\alpha a$, where $\Theta w$ represents an angle intervening between said first recording rotary head and said second recording rotary head on the outer periphery of said rotatable drum as viewed in the rotating direction thereof and satisfies the condition that $\Theta w<180°$, and $\alpha a$ represents an angle intervening between said first reproducing rotary head and said first recording rotary head on the outer periphery of said rotatable drum as viewed in the rotating direction thereof and satisfies the condition that $\alpha a<180°$, and wherein said compressing means compresses said second digital data by a ratio $\Theta r/\alpha b$, where $\Theta r$ represents an angle intervening between said first reproducing rotary head and said second reproducing rotary head on the outer periphery of said rotatable drum as viewed in the rotating direction thereof and satisfies the condition that $\Theta r<180°$, and $\alpha b$ represents an angle intervening between said second reproducing rotary head and said second recording rotary head on the outer periphery of said rotatable drum as viewed in the rotating direction thereof and satisfies the condition that $\alpha b<180°$.

3. A helical-scan type digital data recording apparatus according to claim 2, wherein said compressing means includes means for compressing said first digital data by increasing a frequency for recording said first digital data by a ratio of $\alpha a/\Theta w$ while compressing said second digital data by increasing a frequency for recording said second digital data by a ratio of $\alpha b/\Theta r$.

4. A helical-scan type digital data recording apparatus according to claim 1, further comprising:

control circuit means for controlling recording timings of said first and second digital data, respectively, wherein when said first and second recording rotary heads are so disposed that said first recording rotary head scans the track in precedence to said second recording rotary head, said control circuit means controls recording timings of said first and second digital data so that recording by said first recording rotary head is started in synchronism with a recording start timing of said second recording rotary head.

5. A helical-scan type digital data recording apparatus according to claim 1, wherein said first and second reproducing rotary heads serve for a function for confirming record state by reproducing an input digital signal recorded by said first and second recording rotary heads.

6. A helical-scan type digital data recording method for recording digital data on a magnetic recording medium in a helical track pattern, comprising the steps of:

a) compressing first and second input digital data;

b) writing said compressed digital data onto two adjacent tracks, respectively, by employing first and second recording rotary heads disposed on an outer periphery of a rotatable drum, said first and second recording rotary heads being distanced from each other by a first predetermined space in a rotating direction of said rotatable drum and disposed adjacent to each other in a direction orthogonal to said rotating direction for writing said first and second compressed digital data supplied from said compressing means onto two adjacent tracks, respectively; and c) reading out the first and second compressed digital data recorded by said first and second recording rotary heads from said two adjacent tracks, respectively, by employing first and second reproducing rotary heads disposed on the outer periphery of said rotatable drum at positions opposite to said first and second recording rotary heads with reference to a center of said rotatable drum, said first and second reproducing rotary heads being spaced from each other by a second predetermined space in the rotating direction of said rotatable drum and disposed adjacent to each other in the direction orthogonal to said rotating direction for reading out the first and second compressed digital data recorded by said first and second recording rotary heads from said two adjacent tracks, respectively, wherein said step a) includes the substeps of:

compressing said first digital data such that a recording period required for recording said first digital data on one track by said first recording rotary head is shortened by a time for which the recording period of said first recording rotary head for one track and the reproducing period of said second reproducing rotary head for one track overlap each other; and compressing said second digital data such that a recording period required for recording said second digital data on one track by said second recording rotary head is shortened by a time for which the recording period of said second recording rotary head for one track and a reproducing period of said first reproducing rotary head for one track overlap each other, whereby the recording periods of said first and second recording rotary heads and the reproducing periods of said first and second reproducing rotary heads, respectively, are prevented from overlapping each other.

7. A helical-scan type digital data recording method according to claim 6, wherein said step a) includes:

a substep of compressing said first digital data by a ratio $\Theta w/\alpha a$, where $\Theta w$ represents an angle intervening between said first recording rotary head and said ond recording rotary head on the outer periphery of said rotatable drum as viewed in the rotating direction thereof and satisfies the condition that $\Theta w<180°$, and $\alpha a$ represents an angle intervening between said first reproducing rotary head and said first recording rotary head on the outer periphery of said rotatable drum as viewed in the rotating direction thereof and satisfies the condition that $\alpha a<180$; and a substep of compressing said second digital data by a ratio $\Theta r/\alpha b$, where $\Theta r$ represents an angle intervening between said first reproducing rotary head and said second reproducing rotary head on the outer periphery of said rotatable drum as viewed in the rotating direction thereof and satisfies the condition that $\Theta r<180$, and $\alpha b$ represents an angle intervening between said second reproducing rotary head and said second recording rotary head on the outer periphery of said rotatable drum as viewed in the rotating direction thereof and satisfies the condition that $\alpha b<180°$.

8. A digital data recording method according to claim 7, wherein said step a) includes:

a substep of compressing said first digital data by increasing a frequency for recording said first digital data by the ratio of $\alpha a/\Theta w$; and a substep of compressing said second digital data by increasing a frequency for recording said second digital data by the ratio of $\alpha b/\Theta r$.

9. A helical-scan type digital data recording method according to claim 6, further comprising:

a step d) of controlling recording timings of said first and second digital data so that recording by said first recording rotary head is started in synchronism with a recording start timing of said second recording rotary head when said first and second recording rotary heads are so disposed that said first recording rotary head scans the track in precedence to said second recording rotary head.

10. A helical-scan type digital data recording method according to claim 6, wherein said first and second reproducing rotary heads used in said step c) serve for a function for confirming record state by reproducing an input digital signal recorded by means of said first and second recording rotary heads.

* * * * *